W. N. BOOTH.
SPLIT CLENCHER DEMOUNTABLE RIM AND LOCKING AND ALINING DEVICE THEREFOR.
APPLICATION FILED DEC. 19, 1911.
1,240,789. Patented Sept. 18, 1917.
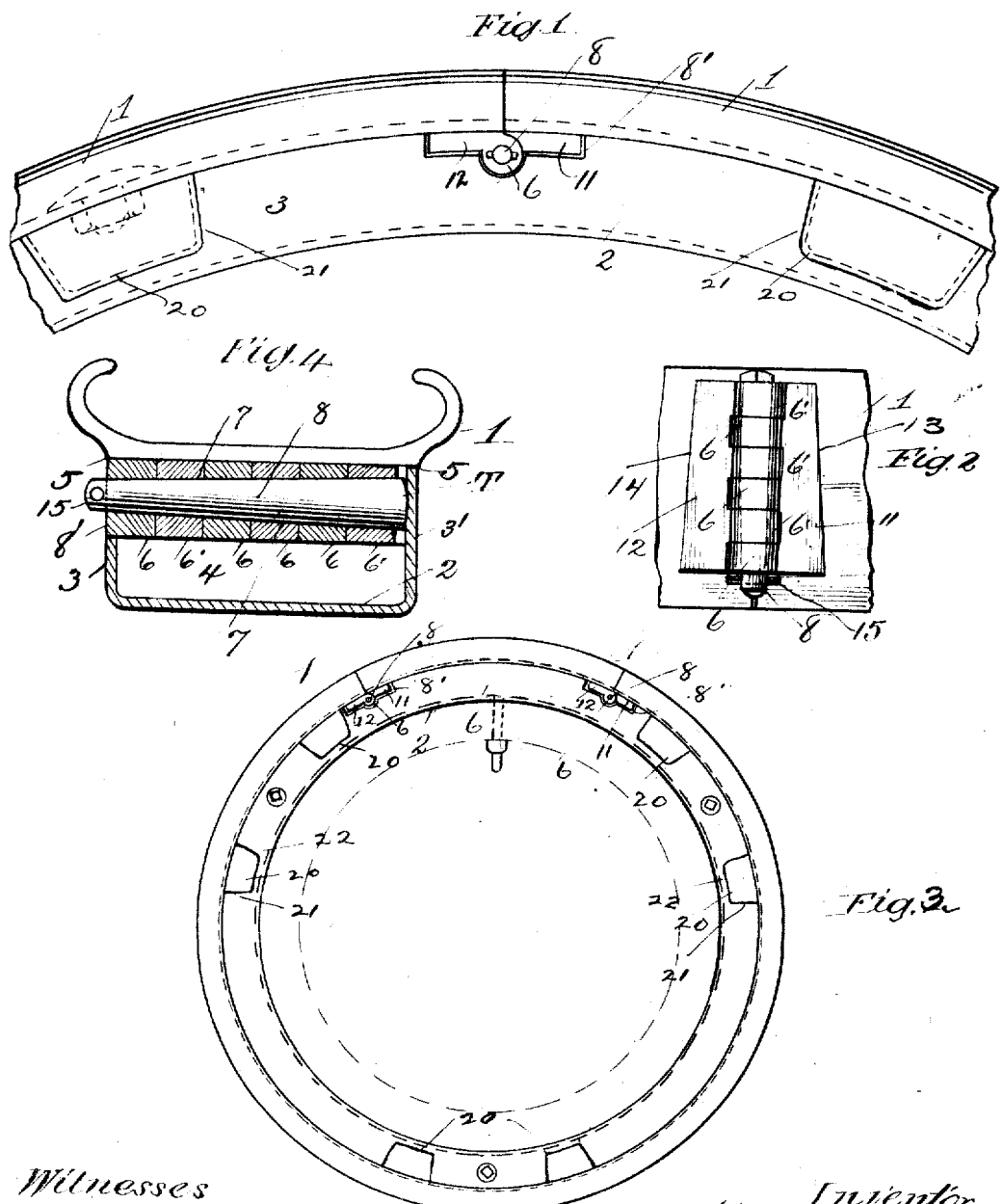

UNITED STATES PATENT OFFICE.

WILLIAM N. BOOTH, OF DETROIT, MICHIGAN, ASSIGNOR TO KELSEY WHEEL COMPANY INC., OF DETROIT, MICHIGAN, A CORPORATION OF NEW YORK.

SPLIT CLENCHER DEMOUNTABLE RIM AND LOCKING AND ALINING DEVICE THEREFOR.

1,240,789.  Specification of Letters Patent.  Patented Sept. 18, 1917.

Application filed December 19, 1911. Serial No. 666,832.

*To all whom it may concern:*

Be it known that I, WILLIAM N. BOOTH, a citizen of the United States, and resident of Detroit, in the county of Wayne and State of Michigan, have invented certain new and useful Improvements in Split Clencher Demountable Rims and Locking and Alining Devices Therefor, of which I hereby declare the following to be a full, clear, and exact description, such as will enable others skilled in the art to which it appertans to make and use the same.

The invention comprises means for enabling the split rim of a tire to be separated for the attachment of the tire, said means serving also to rigidly connect and absolutely aline the several parts together.

The device is also useful and practical for securing a removable and insertible portion of a rim to the main portion, so that the alinement of the several parts of the rim is maintained under all conditions of strain and shock and the rim will operate substantially as one rigid and integral part.

The removal of a short portion from a split rim permits the rim to be collapsed when it is desired to place a tire thereon or to remove the same, but heretofore great difficulty has been experienced in rigidly connecting the removable portion with the open ends of the rim, and in securing them and abutting them in perfect alinement with each other.

When no removable portion is provided the open extremities of the rim can be rigidly secured together and maintained in perfect alinement with each other, by improved means hereinafter described, and the extremities can be separated after they are released by pressing them inwardly and then separating them laterally.

If there is any want of rigidity in the securing means the meeting parts are continually getting out of alinement and the soft tire is then cut or torn by the projecting edges.

The securing means is such as to hold the meeting edges of the rim, or rim and inserted section in perfect alinement circumferentially and laterally, so that no projecting edges can occur.

The invention relates to a split tire rim that can be used in connection with my demounting device for fixed and demountable rims for which I have obtained Letters Patent dated April 12, 1909, and bearing Number 954,416, and also described in my previous application for demounting device bearing Ser. No. 566,753 and date of filing of June 14, 1910, now Patent 1,146,301, July 13, 1915.

In this device a fixed channeled rim is employed, in which the demounting mechanism is inclosed and the removable rim rests upon the open edges of the channeled rim.

The invention comprises a series of lugs placed upon one of the open ends of the split rim and alternating with a series of similar lugs on the opposite end of the rim, or on the adjoining ends of the inserted portion, the lugs on one portion interlocking with those on the other portion, and inclosed between the side walls of the channeled fixed rim.

These series of interlocking lugs are pierced with registering openings and a continuous taper opening extending through all of them and through this opening a tapered pin is passed before attaching the demountable rim to the fixed rim to absolutely aline the edges of the rim and secure them together with absolute rigidity.

One wall of the channeled rim is provided with an opening through which the interlocking lugs are introduced into the channel, and the large end of the tapered pin rests against the inner surface of the opposite wall of the channel so that the pin cannot be withdrawn except after removing the outer rim from the inner one.

The invention is illustrated in detail in the accompanying drawings, is hereinafter more fully described in connection therewith, and specifically pointed out in the claims.

In the accompanying drawings Figure 1 is a side elevation of a portion of the outer and inner rims, showing the locking device for the extremities of the inserted portion with the extremity of the outer rim; Fig. 2 is a plan view of the interlocking parts of the outer rim and inserted portion on the inside of the rim; Fig. 3 is a side elevation of the entire rim; Fig. 4 is an enlarged transverse section of both rims on the center line of the split between the open extremities of the split rim.

In these views 1 is the split outer rim, 2 is the rigid fixed rim provided with the outwardly extending circumferential marginal side walls 3, 3' inclosing the channel 4 between them.

The outer rim rests at 5, 5, upon the outer edges of these flanges when the rims are joined together.

6, 6' are lugs extending from the respective ends of the split rim toward each other and interlocking with each other when the ends are closed together.

A continuous tapered opening 7 is bored and reamed out through all the lugs 6 and 6' when they are interlocked and a tapered pin 8 is introduced therein which preferably projects slightly from the side of the outer lug on that side.

One side wall 3 is provided with an opening 8' corresponding in general shape with that of the lugs and through this opening the lugs are introduced into the channel 4. The butt T, or widest end of the tapered pin is placed against the opposite wall 3' of the channel when the outer rim is put in place and hence the pin cannot be withdrawn or the split rim extremities separated until the rims are separated from each other.

The lugs 6, 6' are preferably integral with flat plates 11 and 12 which are secured to the undersides of the extremities of the split rim and these plates are welded, brazed or riveted upon the rim. Heretofore the rims have generally been separated at the split to permit of contraction or have had inclined engaging edges permitting one end to slide upon the other when collapsed. Here the recess 8' in the felly band or rim engages the plates 11 and 12 and without the pin 8 would prevent the split ends of the rim from separating and the tire holding ring from creeping in the felly rim. The rim end interlocking plates are in separable end to end abutment upon the inner periphery of the rim and are rigidly secured by welding or otherwise to the respective ends of the rim thus bringing the ends of the rim into positive abutment with each other. The pin 8 gives an added security to the fastening device.

Except for the purpose of retaining the ends of the rim together when it is removed from the felly rim or band the pin 8 is not positively required and can therefore be dispensed with if desired, since the engagement of the plates 11 and 12 with the ends of the recess 8' in the felly rim or band will prevent the ends of the tire holding rim from separating. The eyes 6, 6' overlap the opposed extremities of the rim and hence serve to prevent the ends from flying outward in case the pin should be lost.

The fact that the plates interlock upon an irregular line at the split in the rim opposes lateral separation of the rim ends.

The lateral edges 13 and 14 of these plates are tapered inwardly so as to easily enter the opening 8' and are reversely tapered to the taper of the pin.

In the figures are also shown the wedging lugs 20, 20, on the outer rim, which enter openings 21, 21 in one wall of the channel and engage corresponding surfaces 22, 22 in the channel on the fixed rim as described in the aforesaid Letters Patent.

Having described the invention what I claim as new and desire to secure by Letters Patent is:

1. The combination with a fixed integral channeled rim, of a split demountable rim sleeved thereon and closely engaging the channeled edges thereof, rigid interlocking lugs upon the margins of the ends of said split rim, and inclosed in said channeled rim, said lugs having continuous tapered openings therethrough, the said channeled rim provided with a lateral opening in one wall through which said lugs are inserted, a tapered pin inserted in the said tapered openings, the large end of said tapered pin abutting against the inner surface of the channel wall, opposite said opening, whereby said tapered pin is prevented from escaping.

2. The combination with a fixed channeled rim, and a split demountable rim sleeved thereover, of a series of lugs upon one extremity of said split rim, and a series of lugs upon the other extremity of said split rim interlocking with said aforesaid series of lugs, means for detachably securing said series of lugs together, said lugs inclosed between the walls of said channel, one of the side walls of said channeled rim serving to engage and prevent the displacement of said securing means, when the rim parts are interlocked.

In testimony whereof, I hereunto set my hand this 20th day of November, 1911.

WILLIAM N. BOOTH.

In presence of—
 WM. M. MONROE,
 P. BREDEL.